(12) United States Patent
Inaoka et al.

(10) Patent No.: US 7,968,139 B2
(45) Date of Patent: *Jun. 28, 2011

(54) PACKAGED BEVERAGES

(75) Inventors: Setsujiro Inaoka, Tokyo (JP); Masaki Iwasaki, Tokyo (JP); Susumu Ohishi, Tokyo (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 927 days.

This patent is subject to a terminal disclaimer.

(21) Appl. No.: 10/416,924

(22) PCT Filed: Nov. 16, 2001

(86) PCT No.: PCT/JP01/10043
§ 371 (c)(1),
(2), (4) Date: May 16, 2003

(87) PCT Pub. No.: WO02/39822
PCT Pub. Date: May 23, 2002

(65) Prior Publication Data
US 2004/0028793 A1 Feb. 12, 2004

(30) Foreign Application Priority Data

Nov. 17, 2000 (JP) .................. 2000-350712
Feb. 22, 2001 (JP) .................. 2001-046224

(51) Int. Cl.
*A23F 3/00* (2006.01)
(52) U.S. Cl. .................. 426/597; 426/106; 426/590
(58) Field of Classification Search .................. 426/597, 426/435, 590, 106
See application file for complete search history.

(56) References Cited

U.S. PATENT DOCUMENTS

| | | | |
|---|---|---|---|
| 3,163,539 A * | 12/1964 | Barch ...................... 426/271 |
| 3,528,819 A | 9/1970 | Hamilton et al. |
| 4,051,264 A * | 9/1977 | Sanderson et al. .............. 426/52 |
| 4,680,193 A * | 7/1987 | Lunder et al. .................. 426/597 |
| 4,891,231 A * | 1/1990 | Mai et al. ...................... 426/52 |
| 4,935,256 A * | 6/1990 | Tsai .......................... 426/330.3 |
| 4,946,701 A * | 8/1990 | Tsai et al. ...................... 426/597 |
| 5,427,806 A * | 6/1995 | Ekanayake et al. ......... 426/330.3 |
| 5,464,619 A * | 11/1995 | Kuznicki et al. ............... 424/439 |
| 5,766,595 A * | 6/1998 | Yamane et al. ................ 424/729 |
| 5,780,086 A * | 7/1998 | Kirksey et al. .............. 426/330.3 |
| 5,879,733 A * | 3/1999 | Ekanayake et al. ............ 426/271 |
| 6,036,991 A * | 3/2000 | Humphrey et al. ............ 426/597 |
| 6,063,428 A | 5/2000 | Mohlenkamp et al. |
| 6,068,862 A * | 5/2000 | Ishihara et al. .................. 426/2 |
| 7,014,876 B2 | 3/2006 | Iwasaki et al. |
| 7,029,718 B2 * | 4/2006 | Ohishi et al. .................. 426/597 |
| 7,056,547 B2 * | 6/2006 | Ogura et al. .................. 426/597 |
| 7,056,548 B2 * | 6/2006 | Ogura et al. .................. 426/597 |
| 7,220,444 B2 | 5/2007 | Ogura et al. |
| 7,279,193 B2 | 10/2007 | Oishi et al. |
| 7,323,205 B2 | 1/2008 | Otsuka et al. |
| 2002/0034576 A1 * | 3/2002 | Burgess ...................... 426/597 |
| 2003/0096050 A1 | 5/2003 | Inaoka et al. |
| 2004/0028793 A1 | 2/2004 | Inaoka et al. |
| 2004/0065207 A1 * | 4/2004 | Oishi et al. .................. 99/275 |
| 2005/0084574 A1 | 4/2005 | Yamada |
| 2005/0129829 A1 | 6/2005 | Hosoya et al. |
| 2005/0158437 A1 | 7/2005 | Itaya et al. |
| 2005/0163889 A1 | 7/2005 | Yamada et al. |
| 2006/0057261 A1 | 3/2006 | Ogura et al. |
| 2006/0073242 A1 | 4/2006 | Yamada et al. |
| 2006/0099318 A1 | 5/2006 | Iwasaki et al. |
| 2006/0134286 A1 * | 6/2006 | Maeda ...................... 426/335 |
| 2006/0141119 A1 | 6/2006 | Yamamoto et al. |
| 2006/0263454 A1 | 11/2006 | Sugiyama et al. |
| 2007/0048430 A1 | 3/2007 | Konishi et al. |
| 2007/0059424 A1 | 3/2007 | Iwasaki et al. |
| 2007/0092624 A1 | 4/2007 | Iwasaki et al. |
| 2007/0104851 A1 | 5/2007 | Iwasaki et al. |
| 2007/0128327 A1 | 6/2007 | Takashima et al. |
| 2007/0141219 A1 | 6/2007 | Iwasaki et al. |
| 2007/0148308 A1 | 6/2007 | Niwa |
| 2007/0184174 A1 | 8/2007 | Ogura et al. |
| 2008/0026113 A1 | 1/2008 | Hayashi et al. |
| 2008/0038408 A1 | 2/2008 | Hosoya et al. |

(Continued)

FOREIGN PATENT DOCUMENTS

EP 0 201 000 11/1986

(Continued)

OTHER PUBLICATIONS

Translation: Asaka, Masashi, "Search for an Antibacterial Substance in Thermally Treated Green Tea Drinks.", Jun. 2008 (previously submitted Dec. 31, 2008).*

(Continued)

*Primary Examiner* — Rena L Dye
*Assistant Examiner* — Viren Thakur
(74) *Attorney, Agent, or Firm* — Oblon, Spivak, McClelland, Maier & Neustadt, L.L.P.

(57) ABSTRACT

Provided is a packaged beverage, which comprises, in the dissolved form, catechins composed of the following non-polymer component (A) and another non-polymer component (B):
(A) non-epi-catechins,
(b) epi-catechins, and has, per 500 mL of the packaged beverage, said components in amounts satisfying the following equations:

$(A)+(B)=460$ to $2500$ mg          (i)

$(A)=160$ to $2250$ mg          (ii)

$(A)/(B)=0.54$ to $9.0$.          (iii)

The packaged beverages of the present invention are excellent in stability of color tone and transparent appearance even after long-term storage, have smooth feeling in the throat upon drinking, and have good palatability; and in addition, have PPAR-dependent gene transcription activating effects which are safe and effective for prevention and alleviation of obesity.

24 Claims, No Drawings

U.S. PATENT DOCUMENTS

2008/0044545 A1     2/2008     Fukuda et al.

FOREIGN PATENT DOCUMENTS

| | | |
|---|---|---|
| EP | 0416667 | 3/1991 |
| EP | 0819433 | 1/1998 |
| JP | 60-156614 | 8/1985 |
| JP | 1-174328 | 7/1989 |
| JP | 3-133928 | 8/1991 |
| JP | 04255792 A * | 9/1992 |
| JP | 5-49401 | 3/1993 |
| JP | 5-168407 | 7/1993 |
| JP | 05246846 A * | 9/1993 |
| JP | 6-209707 | 8/1994 |
| JP | 06343389 A * | 12/1994 |
| JP | 08053353 A * | 2/1996 |
| JP | 08-298930 | 11/1996 |
| JP | 10-004919 | 1/1998 |
| JP | 10-4919 | 1/1998 |
| JP | 10004919 A * | 1/1998 |
| JP | 10-234301 | 9/1998 |
| JP | 11-116418 | 4/1999 |
| JP | 11-504224 | 4/1999 |
| JP | 11-262359 | 9/1999 |
| JP | 2000 060427 | 2/2000 |
| JP | 2000-60427 | 2/2000 |
| JP | 2003333989 A * | 11/2003 |
| JP | 2004041186 A * | 2/2004 |
| JP | 2004262927 A * | 9/2004 |
| WO | 97 30597 | 8/1997 |

OTHER PUBLICATIONS

Notice of Opposition to the Grant of Patent; Notice of Opposition(ITO EN, LTD.); Opposition No. 2003-71208; Patent No. 3342698; May 12, 2003 English translation provided.

Notice of Opposition to the Grant of Patent; Notice of Opposition(ITO EN, LTD.); Opposition No. 2003-70843; Patent No. 3329799; Mar. 31, 2003 English translation provided.

Notice of Opposition to the Grant of Patent; Notice of Opposition(Kiichiro Yoshikawa); Opposition No. 2003-72082(01); Patent No. 3378577; Aug. 13, 2003 English translation provided.

Notice of Opposition to the Grant of Patent; Notice of Opposition(ITO EN, LTD.); Opposition No. 2003-72082(02); Patent No. 3378577; Aug. 18, 2003 English translation provided.

T. Tsuchida, et al., Progress in Medicine, vol. 22, No. 9, pp. 127 (2189)-141 (2203), "Reduction of Body Fat in Humans by Long-Term Ingestion of Catechins", 2002 (with partial English translation).

Japanese Journal of Nutritional Assessment, vol. 19, No. 3, pp. 365-376, "Effects of Tea Catechins on Body Fat Metabolism in Women", 2002 (with partial English translation).

N. Osaki, et al., J. Oleo Sci., vol. 50, No. 8, pp. 677-682, "Effect of Tea Catechins on Energy Metabolism in Rats", 2001 (with partial English translation).

K. Onizawa, et al., J. Oleo Sci., vol. 50, No. 8, pp. 657-662, "Effect of Tea Catechins on the Oxidation of Dietary Lipids in Rats", 2001 (with partial English translation).

S. Meguro, et al., J. Oleo Sci., vol. 50, No. 7, pp. 593-598, "Effects of Tea Catechins on Diet-Induced Obesity in Mice", 2001 (with partial English translation).

T. Hase, et al., J. Oleo Sci., vol. 50, No. 7, pp. 599-605, "Anti-Obesity Effects of Tea Catechins in Humans", 2001 (with partial English translation).

T. Nagao, et al., J. Oleo Sci., vol. 50, No. 9, pp. 717-728, "Tea Catechins Suppress Accumulation of Body Fat in Humans", 2001 (with partial English translation).

T. Murase, et al., J. Oleo Sci., vol. 50, No. 9, pp. 711-715, "Dietary Tea Catechins Reduce Development of Obesity Accompanied With Gene Expression of Lipid-Metabolizing Enzymes in Mice", 2001 (with partial English translation).

T. Murase, et al., International Journal of Obesity and Related metabolic Disorders, vol. 26, No. 11, pp. 1459-1464, "Beneficial Effects of Tea Catechins on Diet-Induced Obesity: Stimulation of Lipid Catabolism in the Liver", Nov. 11, 2002.

Wang, L., et al., "Effects of Heat Processing and Storage on Flavanols and Sensory Qualities of Green Tea Beverage," J. Agric. Food Chem., vol. 48, 2000, pp. 4227-4232.

Wang, L., et al., "Effects of Heat Processing and Storage on Flavanols and Sensory Qualities of Green Tea Beverage," J. Agric. Food Chem., vol. 48, 2000, pp. 4227-4232.

Asaga, M., "Screening of Antibacterial Substances in Heated Green Tea Beverage," Abstracts of Research Reports at the 37$^{th}$ Counselors' Meeting of Toyo Food Research Foundation, Oct. 9, 1998, with partial English translation, pp. 23-30.

Definitions of "autoclave" and "retort" from Dictionary of Science and Technology, P.M.B. Walker (Ed), 1995, Larousse (New York), p. 73 and 934.

Lindboe, W. G., et al., "Comparative Terminal Sterilization," Journal of Parental Science & Technology, vol. 47, 1993, pp. 138-141.

Varnam, A. H., et al., "Chemistry of Acidulants Used in Soft Drinks," Chapter 3.3.3 of Beverages: technology, chemistry and microbiology, 1994, pp. 108-109.

Seto, Ryota et al., "Preparation of Epimers of Tea Catechins by Heat Treatment", Food Research Laboratories, Mitsui Norin Co., Ltd., 223-1 Miyabara, Fujieda-shi, Shizuoka 426-01, Japan, Biosci. Biotech. Biochem. 61(9), pp. 1434-1439, 1997.

Beverage Japan No. 188 "Super Catechin' put on the Market", pp. 14 (Aug. 1997) (partial translation).

Bokuchava, M. A. et al., "Conversion of Catechols in Tea leaves Under the Influence of Elevated Temperatures", Journal reference: Biochemistry, USSR, 23, No. 2 (1958), pp. 206-208, Unilever references: RDK/FOPN3020.

Komatsu, Yoshihiro et al., "Effects of Ph and Temperature on Reaction Kinetics of Catechins in Green Tea Infusion", Biosci. Biotech. Biochem. 57 (6), pp. 907-910, 1993.

Kinugasa, Hitoshi et al., "Mechanism of Retort Smell Development during Sterilization of Canned Tea Drink and Its Deodorization Measure", Nippon Nogeikagaku Kaishi vol. 63, No. 1, pp. 29-35, 1989.

G. H. Zhang, "Study on Solving Tea Cream using Cyclodextrin", Food Science, 2000, vol. 21, No. 12, pp. 95-99.

Chao, Y.C. et al., "Reverse Osmosis Concentration of Paochung Tea Infusion", Food Science, 1995, 22(6) pp. 653-662.

U.S. Appl. No. 11/719,362, filed May 15, 2007, Kataoka, et al.

S. Suematsu et al.: "Effects of pH on stability of constituents in canned tea drinks. Studies on preservation of constituents in canned drinks. I." Database FSTA 'Online! International Food Information Service (IFIS), Franfurt/Main, Germany Database accession No. 92-1-11-h0121, XP002199727, 1992.

Li-Fei Wang et al.: Effects of heat processing and storage on flavanols and sensory qualities of green tea beverage J. Agric. Food Chem., vol. 48, pp. 4227-4232 2000.

Notice of Opposition to the Grant of Patent: Opposition No. 2003-71083 (JPO); Patent No. 3338705, Filed: Apr. 28, 2003.

Römpp Lexikon Chemie, 10. Aurflage, Band 1, 1996, p. 322 with the keyword, Autoklaven.

European Oppisition Decision for Application No. 01 982 825.0 dated Jul. 1, 2008.

English Translation of the Japanese Decision for Opposition; Opposition No. 2003/70843.

Asaka, M., "Screening of Antibacterial Substances in Heated Green Tea Beverage," Abstracts of Research Reports at the 37$^{th}$ Counselors' Meeting of Toyo Food Research Foundation, Oct. 9, 1998 (English Translation).

Nippon Shokuhin Kogyo Gakkaishi, vol. 34, No. 1, pp. 20-27 1987.

Canning Review, vol. 74, No. 9, pp. 1000-1006 1995.

Journal of the Agriculture Laboratories in Miyazaki Prefecture, No. 136, pp. 43-44 2000 (with partial English translation).

Report of the Miyazaki Industrial Technology Center The Miyazaki Food Development Center, No. 44, pp. 111-114 1999 (with partial English translation).

\* cited by examiner

PACKAGED BEVERAGES

TECHNICAL FIELD

The present invention relates to packaged beverages containing a high concentration of catechins.

BACKGROUND ART

It is reported that hcatecins act as an inhibitor against a rise in cholesterol level (Japanese Patent Application Laid-Open (kokai) No. Sho 60-156614) or as an α-amylase activity inhibitor (Japanese Patent Application Laid-Open (kokai) No. Hei 3-133928). This suggests that tea beverages such as green tea, black tea and Oolong tea have useful physiological benefits. When these beverages were put on the market, some measures have been taken to improve their taste and color tone or to make them respond to changes upon storage. For example, a method for preparing a beverage by controlling pH upon extraction and preserving the good condition of natural catechins during storing in order to give a desirable state and adjusting the taste and color tone (Japanese Patent Application Laid-Open (kokai) No. Hei 5-168407), a method for sterilizing a beverage under pressure at low temperatures in order to preserve its qualities such as taste for a long period of time (Japanese Patent Application Laid-open (kokai) No. Hei 5-4940177 a method for adding cyclodextrins, thereby alleviating bitterness or astringency particular to catechins (Japanese Patent Application Laid-Open (kokai) No. Hei 10-4919) and a method for removing a retort odor from a green tea beverage (U.S. Pat. No. 2,566,801) are proposed.

The physiological action of catechins can be shown effectively by increasing their intake amount. From the viewpoint of palatability and marketability, beverage forms which facilitate the intake of a large amount of catechins are desirable.

Two methods for increasing the amount of catechins contained as an effective ingredient in a beverage have been reported. One is a method for adding powdered tea leaves (Japanese Patent Application Laid-Open (kokai) No. Hei 10-234301). When catechins are extracted from tea leaves in order to increase the concentration of catechins in a beverage, the resulting beverage becomes inappropriate as a product to be put on the market, because when it is packaged and stored for a long period of time, a marked change in color occurs. The coloration of the beverage gradually changes over time, from a desirable light green color to an ugly brown color. Therefore, there is no problem with such a packaged beverage which contains powdered tea leaves as an effective ingredient when it is consumed directly after production, but it does however lose its product value during a distribution process because of a deteriorated appearance. For example, powdered tea leaves precipitate on the bottom of the container or float on the surface of the beverage. This tendency becomes more marked when a transparent container such as a PET bottle is used. Since opaque containers such as cans cannot be recapped (re-sealed), all the beverage contained therein must be consumed once it is opened. Such a limitation on drinking habits is an inconvenience for customers. Using an opaque PET bottle to hide precipitation does on the other hand, cause a serious problem for recycling. Formation of a precipitate or sedimentation of powdered tea leaves means that the ratio of the ingredients differs between the initial stage of drinking and the latter stage of drinking. However, the addition of a thickening agent to prevent such a phenomenon distorts the smooth feeling in the throat and refreshing taste of the beverage. This is problematic for a beverage providing physiological effects.

The other method for increasing the amount of catechins as an effective ingredient is to add them in dissolved form. When the amount of catechins as an effective ingredient is increased by extraction of tea leaves, the packaged beverage tends to become turbid and a product with such an appearance is not accepted in the market. This turbidity leads to opacity over time and then large visible particles appear in the container.

A beverage having such a color change or turbidity is not visually attractive, which presents a serious problem to be solved when it is put on the market.

The coloration is said to be caused by polyphenol oxide formed by oxidation of catechins.

The turbidity is said to be a phenomenon caused by mutual action between the ingredients of the beverage and the catechins or polyphenol oxide formed by oxidation of catechins. Such a phenomenon tends to occur in acidic or neutral beverages. Turbidity of the beverage becomes prominent when the catechin concentration is increased. The turbidity of the beverage has a negative impact on its appearance and this presents a serious problem to be solved when it is put on the market.

It is presumed that the function of PPAR is to extensively take part in energy metabolism in living bodies and the maintenance of homeostasis, for example, synthesis, transport and secretion of fatty acids, synthesis of ATP in fat-consuming organs and cell-cycle regulation. In particular, it has been revealed that gene expression of β-oxidation related enzymes important for fatty acid metabolism depends greatly on the activation of PPAR.

An object of the present invention is to provide a packaged beverage ving a stable color tone and transparent appearance after long-term storage even with a high catechin content.

DISCLOSURE OF THE INVENTION

The present inventor has found that under specific conditions, a packaged beverage containing a high concentration of catechins maintains a stable color tone and transparent appearance after long-term storage. This stability is obtained by incorporating non-epi-catechins and epi-catechins at a predetermined ratio.

The present inventor has also found that in a packaged beverage which contains non-epi-catechins and epi-catechins at a predetermined ratio, incorporation of cyclodextrins makes its appearance transparent and moreover, stabilizes its transparency even if there is a high content of catechins.

The present inventor searched for a PPAR-dependent gene transcription activator which is safe and has fewer side effects after long-term intake. As a result, the present inventor found that catechins existing in natural foods and have been taken conventionally have such properties.

In one aspect of the present invention, a packaged beverage is thus provided, which comprises, in the dissolved form, catechins composed of the following non-polymer component (A) and another non-polymer component (B):

(A) non-epi catechins, (B) epi-catechins, and contains, per 500 mL of the packaged beverage, these components in amounts satisfying the following equations:

$(A)+(B)=460$ to $2500$ mg,     (i)

$(A)=160$ to $2250$ mg, and     (ii)

$(A)/(B)=0.54$ to $9.0$.     (iii)

In another aspect of the present invention, a packaged beverage is also provided, which comprises the following non-polymer component (A'), another non-polymer component (B'), and component (C):

(A') non-epi-catechins,
(B') epi-catechins,
(C) cyclodextrins; and contains, per 500 mL of the packaged beverage, these components in amounts satisfying the following equations:

$(A')+(B')$=460 to 1300 mg, (i)

$(A')$=160 to 1040 mg (ii)

$(A')/(B')$=0.54 to 4.0, and (iii)

$(C)$=750 to 5000 mg; and has a haze of 22 or less. (iv)

BEST MODE FOR CARRYING OUT THE INVENTION

The term "catechins" as used herein means a generic name of non-epi-catechins such as catechin, gallocatechin, catechin galate and gallocatechin gallate (which may hereinafter be called "Component (A)" or "Compoent (A')") and epi-catechins such as epicatechin, epigallocatechin, epicatechin gallate and epigallocatechin gallate (which may hereinafter called "Component (B)" or "Component (B')").

The catechins to be used in the present invention can be obtained from a water or hot water extract of green teas such as natural leaf tea, refined green tea and Tencha (green tea not powdered); semi-fermented teas which are generically called "Oolong tea", such as Ti Kuan Yin, Se-zhong, Huanjingui and Wuyi Rock Tea, and fermented teas called black teas such as Darjeeling, Assam and Sri Lanka; each made from tea leaves available from varieties belonging to Camellia spp. such as *C. sinensis* and *C. assaimica*, and the Yabukita variety or hybrid thereof.

Tea is extracted by a conventional method such as stirring. Before extraction, an organic acid or organic acid salt such as sodium ascorbate may be added to water. A method for extraction in a non-oxidizing atmosphere while removing dissolved oxygen by boiling for deaeration or feeding of an inert gas such as nitrogen gas may be used in combination.

A beverage having a high content of catechins is preferably prepared by dissolving a tea extract concentrate in water or by mixing an ordinary tea liquid extract with the tea extract concentrate. Mediums in which the tea extract concentrate can be dissolved include water, carbonated water and a tea liquid extract containing catechins of a similar level to the commercially available tea liquid extract. The term "tea extract concentrate" as used herein means the concentrate of an extract obtained by extracting tea leaves with hot water or a water soluble organic solvent in accordance with the process as described in detail in Japanese Patent Application Laid-Open (kokai) No. Sho 59-219384, Hei 4-20589, Hei 5-260907 or Hei 5-306279. Examples include commercially available extracts such as "Polyphenon" of Mitsui Norin Co., Ltd., "Thea-furan" of Itoen, Ltd., "Sunphenon" of Taiyo Kagaku Co., Ltd. and "Sun-oolong" of Suntory Limited. In addition, catechins available from other raw materials, column-purified products and chemically synthesized products can be used. The "tea extract concentrate" in the present invention may exist in various forms such as a solid, an aqueous solution and a slurry.

These catechins are not polymers in a tea liquid extract, and some of them are dissolved in the tea liquid extract, while the others are adsorbed or encapsulated by tea fine powder in their solid form. The catechins to be used in the present invention are solutions of the concentrate of an extract obtained by filtering a tea extract and then drying the filtrate.

Since the content of polyphenols increases as the fermentation condition of tea leaves advances using a concentrate of a green tea extract is particularly preferred as the concentrates of various tea extracts to be added to water or a tea liquid extract. The tea liquid extract is preferably an extract of unfermented tea or semi-fermented tea.

In tea leaves, most catechins exist as epi-catechins, but they change into their steric isomers, non-epi-catechins, by heat treatment or treatment with an alkali. It can be seen that in comparison to epi-catechins, the melting point of non-epi-catechins having the same molecular formula is significantly lower. A further lowering in melting point happens to occur, depending on the mixing ratio of epi-catechins and non-epi-catechins. A functional difference between them has hardly been studied yet.

Non-epi-catechins are obtained by dissolving an extract of green tea, semi-fermented tea or fermented tea or the concentrate of such a tea extract in water and then heating the resulting solution at 40° C. to 140° C. for between 0.1 min and 120 hours. The solution preferably has a pH of 4.5 or greater, because it facilitates formation of non-epi-catechins. The tea extract concentrate having high non-epi-catechins content may be used. They may be used either individually or in a combination.

The packaged beverage of the present invention contains, as Component (A), n-epi-catechins which are non-polymers and are dissolved in water and, as Component (B), epi-catechins which are also non-polymers and dissolved in water in the total amount of 460 to 2500 mg, preferably 500 to 1300 mg, more preferably 600 to 1300 mg, most preferably 640 to 800 mg per 500 mL of the packaged beverage. Amounts within this range are preferred, because they facilitate the intake of a large amount of catechins but do not give the beverage a marked bitterness or astringency. At an amount of 460 mg or greater, the beverage has a favorable taste as if bringing about the effects of catechins.

Per 500 mL of the packaged beverage, Component (A) is incorporated in an amount of 160 to 2250 mg, with 160 to 1880 mg being particularly preferred. Amounts within this range are preferred, because the color tone remains stable even after long-term storage, the transparent appearance is maintained and the flavor is not impaired.

In the packaged beverage, the catechin content in the total polyphenols is 10 wt. % or greater directly after preparation, with 20 wt. % or greater being preferred.

The weight ratio of Component (A) to Component (B) is preferably 0.54 to 9.0, more preferably 0.67 to 5.67, most preferably 0.80 to 5.67. Within this range, the color tone remains stable even after long-term storage, the transparent appearance can be maintained, and the flavor is not impaired.

When catechins selected from epigallocatechin gallate, gallocatechin gallate, epigallocatechin and gallocatechin amount to 30 to 98 wt. %, preferably 40 to 90 wt. % of the catechin content, the resulting beverage has excellent taste which is free from lasting astringency and is therefore preferred. Here, at least one of epigallocatechin gallate, gallocatechin gallate, epigallocatechin and gallocatechin is incorporated in the beverage, but usually all of them are incorporated.

The content of catechins derived from the tea extract concentrate is preferably 5 to 100 wt. %, more preferably 10 to 100 wt. %, most preferably 20 to 100 wt. %, of the total catechin content. The catechin content cannot be controlled readily by a tea liquid extract alone, because the content differs, depending on the extracting conditions of the tea liquid extract or lot-to-lot variations by the variety or growing district of the tea leaves used. Extraction of tea leaves to satisfy the catechin content as specified herein is conducted under strict conditions, which tends to cause intense bitterness and astringency. Use of a tea liquid extract and the tea extract concentrate in combination is preferred, because it not only enables easy adjustment of the amount of catechins but also causes neither strong bitterness nor astringency, maintains a stable color tone even after long-term storage, enables maintenance of a transparent appearance and do not impair flavor.

The haze, as an index for turbidity, of the packaged beverage of no greater than 22, more preferably no greater than 14, most preferably no greater than 12 is preferred for visual effects, smooth feeling in the throat, stability retention of catechins and decrease in color difference. The haze as used herein means a value measured using a glass cell having an optical path length of 10 mm, and is a percentage of the transmitted light that is scattered ranging from 0 to 100. The lower the value, the higher the transparency.

The packaged beverage according to the second aspect of the present invention contains, as Component (A'), non-epi-catechins which are non-polymers and in the form of an aqueous solution and, as Component (B'), epi-catechins which are also non-polymers and in the form of an aqueous solution in the total amount of 460 to 1300 mg, preferably 500 to 1200 mg, more preferably 560 to 1100 mg, most preferably 640 to 1000 mg per 500 mL of the packaged beverage. Amounts within this range are preferred, because they facilitate intake of a large amount of catechins but do not impair excellent transparent appearance and this transparency can be easily maintained.

Component (A') is incorporated in an amount of 160 to 1040 mg, preferably 185 to 975 mg, most preferably 205 to 975 mg per 500 mL of the packaged beverage. At an amount within this range he resulting beverage has excellent transparent appearance and this transparency can be readily maintained.

The weight ratio of Component (A')/Component (B') is preferably 0.54 to 4.0, more preferably 0.67 to 4.0, most preferably 0.82 to 4.0. Within this range, the appearance does not become turbid and transparency can be readily maintained.

Use of a tea liquid extract from unfermented tea such as green tea or semi-fermented tea such as oolong tea is particularly preferred, for excellent transparency of the resulting beverage is not impaired even by an increase in its catechin concentration. The catechin content in the total polyphenols in the packaged beverage directly after preparation is 30 wt. % or greater, preferably 40 wt. % or greater, most preferably 50 wt. % or greater.

A ratio of the catechins derived from the tea extract concentrate is preferably 20 wt. % or greater, more preferably 0.30 wt. % or greater, most preferably 40 wt. % or greater, of the total catechin content. The catechin content cannot be regulated readily only by using the tea liquid extract alone because the content differs depending on the extracting conditions of the tea liquid extract or lot-to-lot variations by the variety or growing district of the tea leaves used. The extraction of tea leaves enough to satisfy the catechin content as specific herein needs strict extracting conditions, tending to cause intense bitterness and astringency. In addition, it causes a drop in the dilution ratio, which inevitably leads to a reduction in production efficiency.

Use of the tea liquid extract and the tea extract concentrate in combination, on the other hand, not only enables easy regulation of the catechin content but also causes neither strong bitterness nor strong astringency, enables maintenance of transparent appearance and does not impair taste. Combined use is therefore preferred.

When catechins selected from epigallocatechin gallate, gallocatechin gallate, epigallocatechin and gallocatechin amount to 30 to 98 wt. %, preferably 40 to 90 wt. % of the catechin content, the resulting beverage has excellent taste which is free from lasting astringency and is therefore preferred. Here, the beverage contains at least one from among epigallocatechin gallate, gallocatechin gallate, epigallocatechin and gallocatechin, but usually contains them all.

α, β- and γ-cyclodextrins, branched α-, β- and γ-cyclodextrins, and α-, β- and γ-cyclodextrin derivatives can be used as cyclodextrins of Component (C) of the packaged beverage according to the second aspect of the present invention. Among them, β-cyclodextrin and branched β-cyclodextrin are preferred, because their use facilitates maintenance of a transparent appearance. In the present invention, these β-cyclodextrins may be used in combination with α-cyclodextrin or γ-cyclodextrin.

The content of the cyclodextrins in the packaged beverage of the second aspect of the present invention is 750 to 5000 mg, preferably 750 to 4000 mg, more preferably 1000 to 4000 mg, per 500 mL of the packaged beverage. The amount within this range facilitates maintenance of a transparent appearance.

A ratio of the total content of Components (A') and (B') to the content of the cyclodextrins, that is, (A')+(B')/(C) is preferably 0.1 to 1.73, more preferably 0.1 to 1.4, most preferably 0.2 to 1.4. Ratios within this range facilitate exhibition of the physiological effects of catechins and maintenance of a transparent appearance.

The haze, as an index for turbidity, of the packaged beverage of no greater than 22, more preferably 14 to 0.1, most preferably 12 to 0.3 is preferred for visual effects, smooth feeling in the throat and stability retention of catechins. If the haze of the beverage is no greater than 22, heightens visual effects and moreover, does not disturb smooth drinking. The beverage develops an excellent smooth feeling in the throat upon drinking.

The packaged beverage is preferably adjusted to have pH 3 to 7, more preferably 4 to 7, most preferably 5 to 7 at 25° C. from the viewpoints of its taste and chemical stability of the catechins.

A variety of tea-containing packaged beverages can be provided by mixing these catechins with a beverage component other than tea, such as juice. For example, these catechins can be added as needed to soft drinks such as carbonated beverages, juice-extract-containing beverages, vegetable-extract-containing juices, near-water drinks, sports beverages and diet drinks. It is also possible to purposely add an insoluble compound such as fine powders of tea leaves to a packaged beverage exhibiting a stable color tone and a transparent appearance after long-term storage, thereby providing the beverage in the suspended form.

To the packaged beverage of the present invention, additives acceptable as an ingredient of the beverage may be added in consideration of its tea-derived ingredients. Examples of such an additive include antioxidants, perfumes, various esters, organic acids, organic acid salts, inorganic acids, inorganic acid salts, inorganic salts, colorants, emulsions, preservatives, seasonings, sweeteners, acidifiers, juice extracts, vegetable extracts, nectar extracts, pH regulators and quality stabilizers. They may be used either individually or in a combination.

For example, sweeteners include sugar, glucose, fructose, isomerized liquid sugar, glycyrrhizin, stevia, aspartame, fructo-oligosaccharide and galacto-oligosaccharide. Artificial sweeteners may also be added. The sweetener is preferably added in an amount of 10 to 100 mg per 500 mL of the beverage.

Examples of acidifiers include, as well as juices extracted from natural components, citric acid, tartaric acid, malic acid, lactic acid, fumaric acid and phosphoric acid. The acidifier is preferably added in an amount of 10 to 100 mg per 500 mL of the beverage.

Examples of inorganic acids and inorganic acid salts include phosphoric acid, disodium phosphate, sodium metaphosphate and sodium polyphosphate, while organic acids and organic acid salts include citric acid, succinic acid, itaconic acid, malic acid and sodium citrate. The salt for adjusting the taste of the beverage is preferably added in an amount of 100 to 2000 mg, more preferably 100 to 1000 mg, most preferably 200 to 1000 mg per 500 mL of the beverage.

Ordinary Containers such as molded containers (so-called PET bottles) composed mainly of polyethylene terephthalate, metal cans, paper containers lined with a metal foil or plastic film and bottles can be used as a container for the packaged beverage. Here, the packaged beverage means a beverage which can be consumed without dilution.

The packaged beverage of the present invention is prepared, for example, by completely filling a container such as metal can with the beverage or carrying out either deaeration and/or nitrogen purging; and then if possible, sterilizing it under conditions as specified by Food Sanitation Law. If the container is not suitable for retort sterilization, for example, a PET bottle or paper container, then a method for sterilizing the beverage under similar conditions to those described above, for example, heating it at a high temperature for a short time by a plate type heat exchanger, cooling it to a predetermined temperature and then, transferring it to the container is used. Under sterile conditions, another ingredient may be added to the container which already has the beverage therein. Furthermore, sterilization is possible by heating under acidic conditions, followed by converting the pH to neutral again under sterile conditions; or sterilization by heating under neutral conditions, followed by converting the pH to acidic again under sterile conditions.

Stability in color tone and maintenance of a transparent appearance upon long-term storage of the packaged beverage of the present invention is improved by incorporating a high concentration of catechins and at the same time, by increasing the content of non-epi-catechins.

The packaged average according to the second aspect of the present invention has an improved transparent appearance due to the incorporation of a high concentration of catechins an increase in the content of non-epi-catechins, and the addition of further cyclodextrins.

EXAMPLES

Measurement of the Amount of Catechins

By using high-performance liquid chromatograph ("Model SCL-10AVP") manufactured by Shimadzu Corporation and equipped with a packed column for an octadecyl-introducing liquid chromatograph, "L-Column TM ODS (4.6 mmø×250 mm: manufactured by Chemicals Evaluation and Research Institute, a beverage filtered through a filter (0.8 μm) was subjected to a gradient method at the column temperature of 35° C. As mobile phase liquid A and liquid B, a distilled water solution containing 0.1 mol/L of acetic acid and an acetonitrile solution containing 0.1 mol/L of acetic acid were used respectively. Measurement was conducted under the conditions of a sample injection amount of 20 μL and an UV-detector wavelength of 280 nm.

Measurement of Turbidity

Haze (H) was measured at 25° C. by using a Haze & transmittance meter ("Model HR-100") manufactured by Murakami Color Research Laboratory Co., Ltd. and charging the beverage in a glass cell (mm wide and 40 mm long, optical path length: 10 mm).

| Evaluation | Haze (H) |
|---|---|
| 1 | $H \leq 14$ |
| 2 | $14 < H \leq 22$ |
| 3 | $22 < H$ |

Measurement of Color Tone

A colorimeter ("Model CT-310") of Minolta Co., Ltd. and a glass cell having an optical path length of 20 mm were used. After ion exchange water was poured and calibration was performed with an illuminant C, $L^*$, $a^*$ and $b^*$, values of the beverage were measured at 25° C. The sample used was prepared by allowing the beverage to stand for 40 hours in a convection type drier at 50° C. The color difference ($\Delta E$) by the $L^*$, $a^*$, $b^*$ color system is calculated in accordance with Equation 3 in chapter IV of "Handbook of Color Technology, p 119,written by Yukio Murata, published by Sogo Gijutsu Ltd". The color difference of the sample was determined as $\Delta$, with the color of the sample before placement in the convection type drier as a standard.

| Evaluation | $\Delta E$ |
|---|---|
| 1 | $\Delta E < 10$ |
| 2 | $10 \leq \Delta E < 20$ |
| 3 | $20 \leq \Delta E < 30$ |
| 4 | $30 \leq \Delta E$ |

Transparency upon Storage (Visual Judgment of Appearance)

After an acceleration test of the packaged beverage was made by allowing it to stand in a convection type drier at 50° C. for 40 hours, a change in transparency was visually assessed against the state of the packaged beverage before storage as standard.

| Evaluation | |
|---|---|
| 1 | A change was hardly recognized. |
| 2 | A slight change was recognized. |
| 3 | An obvious change was recognized. |

Stability

Stability was judged in consideration of a change in color difference and a visual change in transparency.

| Evaluation | |
|---|---|
| 1 | Having a score no greater than 1 in a change in color difference and a score of 1 in visual judgement. |
| 2 | Having a score of 2 in a change in color difference and a score of 2 in visual judgment. |
| 3 | Having a score of 3 in a change in color difference and a score of 3 in visual judgment. |

Example 1

Ingredients as shown in Table 1 were mixed, followed by a predetermined treatment. The resulting treated mixture was transferred into a container as described in Table 1, whereby a packaged beverage was prepared.

TABLE 1

|  |  | Invention product | | | | Comparative product | | | g |
|---|---|---|---|---|---|---|---|---|---|
|  |  | 1 | 2 | 3 | 4 | 1 | 2 | 3 |
| Tea extract | Oolong tea liquid extract*1 | — | — | — | 947 | — | — | — |
|  | Tea extract condensate*2 | | | | | | | |
|  | a | 4.4 | — | — | — | 4.4 | — | 4.8 |
|  | b | — | — | 4.8 | — | — | — | — |
|  | c | — | — | — | 17.6 | — | 4.2 | — |
|  | d | — | 4.2 | — | — | — | — | — |
| Sodium ascorbate | | 0.3 | 0.3 | 0.39 | 2.2 | 0.3 | 0.3 | 0.39 |
| Distilled water | | Balance | Balance | Balance | Balance | Balance | Balance | Balance |
| Total weight | | 1000 | 1000 | 1300 | 4400 | 1000 | 1000 | 1300 |
| pH*3 | | 6.0 | 6.0 | 3.8 | 6.5 | 6.0 | 6.0 | 3.8 |
| Post treatment (heating) Temperature (° C.) | | 121 | — | 65 | 139 | — | — | 65 |
|  | | 5 | — | 10 | *4 | — | — | 10 |
| Time (minute) Container | | PET bottle | Glass bottle | Metal can | Paper pack | PET bottle | Glass bottle | Metal can |

*1: obtained by adding 33 g of oolong tea leaves to 1 kg of ion exchange water heated and maintained at 85° C. to extract for 8 minutes and then filtering off the leaves through a flannel filter while cooling by a heat exchanger.
*2: concentrate of tea extract
a: catechin content: 33 (wt. %), of which non-epi-catechins content: 4 (wt. %) (product of Mitsui Norin Co., Ltd.)
b: catechin content: 33 (wt. %), of which non-epi-catechins content: 14 (wt. %)
c: catechin content: 30 (wt. %), of which non-epi-catechins content: 3 (wt. %) (product of Mitsui Norin Co., Ltd.)
d: catechin content: 30 (wt. %), of which non-epi-catechins content: 14 wt. %
*3: pH of each of Invention products 1 and 2 and Comparative products 1 and 2 was adjusted with citric acid/disodium phosphate; that of each of Invention product 3 and Comparative product 3 was adjusted with citric acid; and that of Invention product 4 was adjusted with sodium bicarbonate.
*4: 10 seconds (the beverage passed through a deaeration line prior to the sterilization step).

Analysis results of catechins contained in 500 mL of the packaged beverage for each of Invention products 1 to 4 and Comparative products 1 to 3 and measurement results of the properties of the beverage are shown in Table 2.

TABLE 2

|  | Invention product | | | | Comparative example | | | (mg/500 mL) |
|---|---|---|---|---|---|---|---|---|
|  | 1 | 2 | 3 | 4 | 1 | 2 | 3 |
| Catechin | 42 | 36 | 31 | 51 | 13 | 14 | 7 |
| Epicatechin | 33 | 35 | 26 | 55 | 50 | 59 | 43 |
| Gallocatechin | 164 | 134 | 155 | 182 | 1 | 53 | 39 |
| Epigallocatechin | 107 | 72 | 73 | 150 | 210 | 154 | 174 |
| Catechin gallate | 41 | 28 | 31 | 35 | 12 | 12 | 5 |
| Epicatechin gallate | 47 | 50 | 34 | 74 | 80 | 73 | 62 |
| Gallocatechin gallate | 197 | 103 | 165 | 163 | 43 | 34 | 14 |
| Epigallocatechin gallate | 194 | 118 | 155 | 217 | 352 | 206 | 318 |
| Amount of non-epi-catechins (A) | 444 | 301 | 382 | 431 | 69 | 113 | 65 |
| Amount of epi-catechins (B) | 381 | 275 | 288 | 496 | 692 | 492 | 597 |
| A/B | 1.17 | 1.09 | 1.32 | 0.87 | 0.10 | 0.23 | 0.11 |
| Amount of catechins | 825 | 576 | 670 | 927 | 761 | 605 | 662 |
| Turbidity of beverage | 1 | 1 | 1 | 1 | 2 | 1 | 3 |
| Color difference (ΔE) | 1 | 1 | 1 | 1 | 2 | 3 | 2 |
| Appearance visually judged | 1 | 1 | 1 | 1 | 2 | 1 | 3 |
| Stability | 1 | 1 | 1 | 1 | 2 | 3 | 3 |

In Invention products 1 to 4, no change in transparency was observed even over a period of time and color tone was stable, indicating that they were superior to Comparative Products 1 to 3.

Example 2

A tea liquid extract was prepared by extracting 100 g of each of tea leaves as described in Table 3 with 1000 g of distilled water of 80° C. in a clean bench, followed by filtration. The resulting tea liquid extract was mixed with the ingredients described below ingredients to prepare the beverage having the below-described composition. After deaeration, the mixture was heated at 139° C. for 10 seconds and transferred into a 500 mL PET bottle, whereby a packaged beverage was prepared.

After the packaged beverage at 25° C. was shaken well by hand, it was open Its feeling in the throat upon drinking was evaluated by a panel of 5 experts. Results are shown in Table 3.

TABLE 3

| Composition | Invention product 5 | Invention product 6 g |
|---|---|---|
| Tea liquid extract | Black tea 935 | Oolong tea 950 |
| Concentrate of tea extract | 23.3 (c of Ex. 1) | 9.0 (d of Ex. 1) |

TABLE 3-continued

| Composition | Invention product 5 | Invention product 6 |
|---|---|---|
| Sodium ascorbate | 2.5 | 1.8 |
| Ion exchange water | Balance | Balance |
| Total weight | 5000 | 4500 |
| Amount of non-epi-catechins (A) mg/500 mL | 518 | 588 |
| Amount of epi-catechins (B) mg/500 mL | 322 | 228 |
| A/B | 1.61 | 2.58 |
| Amount of catechins mg/500 mL | 840 | 816 |
| pH | 6 | 6 |

(adjusted with sodium bicarbonate)

Invention products 5 and 6 were found to be almost free from a change in stability of both color tone and transparency after storage. They provided smooth feeling in the throat upon drinking and high palatability

Example 3

The packaged beverages as shown in Table 4 were prepared.

TABLE 4

| | Invention product 7 | Invention product 8 | Invention product 9 |
|---|---|---|---|
| Packaged beverage | Containing juice | Carbonated | Containing vegetable juice |
| Concentrate of green tea extract | 0.33 (d of Ex. 1) | 0.5 (d of Ex. 1) | 1.2 (d of Ex. 1) |
| Juice | Grape fruit juice 2.0 | — | Cabbage juice 1.0 |
| Sweetener | Erythritol 2.5 Stevia 0.015 | Sugar 5.0 | Erythritol 3.0 |
| Other ingredients | Lemon flavor 0.15 | Vitamin B 0.02 Ascorbic acid 0.01 | Ascorbic Acid 0.15 |
| Ion exchange water | Balance | Balance | Balance |
| Total weight | 100 | 100 | 100 |
| pH | 4 | 4 | 4 |
| Sterilizing conditions | at 65° C. for 10 min | at 65° C. for 10 min | at 65° C. for 10 min |
| Amount of non-epi-catechins (A) mg/500 mL | 247 | 368 | 1151 |
| Amount of epi-catechins (B) mg/500 mL | 268 | 364 | 469 |
| A/B | 0.92 | 1.01 | 2.45 |
| Amount of catechins mg/500 mL | 515 | 732 | 1620 | pH was adjusted with citric acid in Example 5 and 6, while with malic acid in Example 7.

Invention products 7 to 9 were found to be almost free from a change in stability of both color tone and transparency after storage. They provided a smooth feeling in the throat upon drinking and high palatability.

Example 4

The ingredients as shown in Table 5 were mixed, followed by predetermined treatment. Then, the mixtures were transferred into the containers as shown in Table 5, respectively, whereby packaged beverages were prepared.

TABLE 5

| | Invention products | | | Comparative products | | |
|---|---|---|---|---|---|---|
| | 10 | 11 | 12 | 4 | 5 | 6 |
| Oolong tea liquid extract*1 (g) | 230 | 230 | 230 | 230 | — | 230 |
| Tea extract condensate*2 a (g) | — | — | 6.5 | 3.8 | 9.8 | — |
| b (g) | 3.8 | 3.8 | — | — | — | — |
| c (g) | — | — | — | — | — | 3.8 |
| β-Cyclodextrin (g) | 5.2 | 2.5 | 3.5 | 5.2 | — | — |
| Sodium ascorbate (g) | 0.39 | 0.39 | 0.39 | 0.39 | 0.3 | 0.39 |
| Distilled water (mL) | Balance | Balance | Balance | Balance | Balance | Balance |
| Total volume (mL) | 1300 | 1300 | 1300 | 1300 | 1000 | 1300 |
| pH*3 | 3.8 | 3.8 | 6.2 | 3.8 | 6 | 3.8 |
| Post treatment (heating) Temperature (° C.) | 65 | 65 | 118 | 65 | 139 | 65 |
| Time (minute) | 10 | 10 | 20 | 10 | 0.2 | 10 |
| Container | Metal can | Glass bottle | Metal can | Metal can | PET bottle | Glass bottle |

*1, *2 and *3 are similar to those as described in Table 1.

Generation degrees of insoluble matters in the packaged beverage before and after storage at room temperature for 1 month were visually assessed using the following criteria:

| Evaluation | |
|---|---|
| 1 | No change |
| 2 | Slight change |
| 3 | Substantial change |

Moreover, transparency (in terms of haze) directly after preparation of a packaged beverage was measured and its and stability were evaluated thoroughly.

| Evaluation | |
|---|---|
| 1 | Having a haze less than 22 and a score of 1 in stability evaluation |
| 2 | Having a haze of 22 or greater but no greater than 45, or having a score of 2 in stability evaluation |
| 3 | Having a haze exceeding 45, or having a score of 3 in stability evaluation. |

Analysis results of catechins contained in 500 mL of the packaged beverage of each of Invention products 10 to 12 and Comparative products 4 to 6 and measurement results of the properties of the beverage are shown in Table 6.

TABLE 6

| | Invention product | | | Comparative example | | |
|---|---|---|---|---|---|---|
| Amount per 500 mL of beverage | 10 | 11 | 12 | 4 | 5 | 6 |
| Catechin | 31 | 33 | 42 | 3 | 81 | 15 |
| Epicatechin | 26 | 24 | 31 | 64 | 87 | 43 |
| Gallocatechin | 155 | 154 | 197 | 14 | 289 | 103 |
| Epigallocatechin | 73 | 72 | 92 | 220 | 238 | 124 |
| Catechingallate | 31 | 30 | 38 | 5 | 55 | 12 |
| Epicatechin gallate | 34 | 34 | 44 | 63 | 117 | 53 |
| Gallocatechin gallate | 165 | 164 | 210 | 19 | 262 | 110 |
| Epigallocatechin gallate | 155 | 154 | 197 | 298 | 345 | 208 |
| Amount of non-epi-catechins (A') | 382 | 381 | 487 | 41 | 687 | 240 |
| (A')/(Total amount of catechins-(A')) | 1.33 | 1.34 | 1.34 | 0.06 | 0.88 | 0.56 |
| Total amount of catechins | 670 | 665 | 851 | 686 | 1470 | 668 |
| A catechin ratio derived from tea extract condensate (%) | 85 | 83 | 89 | 87 | 100 | 85 |
| Turbidity of beverage (haze) | 12 | 11 | 9 | 40 | 24 | 20 |
| Stability of beverage | 1 | 1 | 1 | 2 | 2 | 2 |
| Total evaluation | 1 | 1 | 1 | 3 | 2 | 2 |

Invention products 10 to 12 were each found to be superior to Comparative Products 4 to 6 in transparency of the beverage and in palatability.

Example 5

A tea liquid extract was prepared by extracting 100 g of each of tea leaves as described in Table 7 with 1000 g of distilled water of 80° C. in a clean bench, followed by filtration. The resulting tea liquid extract was mixed with the ingredients described below. After deaeration, the mixture was heated at 139° C. for 10 seconds and transferred into a 500 mL PET bottle, whereby a packaged beverage was prepared.

After the packaged beverage at 25° C. was shaken well by hand, it was open Its feeling in the throat upon drinking was evaluated by a panel of 5 experts.

TABLE 7

| Composition | Invention product 13 | Invention product 14 |
|---|---|---|
| Tea liquid extract (g) | Green tea 935 | Oolong tea 950 |
| Concentrate of tea extract (g) | 7*5 | 9*6 |
| β-Cyclodextrin (g) | 10.4 | 22.5 |
| Sodium ascorbate (g) | 2.5 | 1.8 |
| Ion exchange water (g) | Balance | Balance |
| Total weight (g) | 5000 | 4500 |
| Haze | 12 | 8 |
| Amount of non-epi-catechins mg/500 mL | 354 | 513 |
| Amount of catechins mg/500 mL | 770 | 1023 |
| A catechin ratio derived from tea extract condensate (%) | 74 | 89 |
| pH | 6 | 6 |

*5having a catechin content of 30 (wt. %), of which non-epi-catechins content is 3 (wt. %) (product of Mitsui Norin Co., Ltd.)
*6having a catechin content of 30 (wt. %), of which non-epi-catechins content is 15 (wt. %)

Invention products 13 to 14 as shown in Table 7 were each found to be a beverage excellent in transparency (in terms of haze) and having favorable palatability with smooth feeling in the throat upon drinking.

Example 6

Test on PPAR-Dependent Gene Transcription Activation

The small intestine epithelial cell line IEC-6 and human hepatic cell line HepG2 were inoculated on a 12 well plate and cultured in DMEM (5% FCS) for 24 hours. A DNA chain containing PPAR responsive element (underlined portion) (AACGTGACCTTTGTCCTGGTCAACG TGACCTTTGTCCTGGTC AACG TGACCTTTGTCCTGGTC), a SV40 promoter gene, a PPAR reporter plasmid (PPAR-Luc) containing firefly luciferase gene, and a control plasmid having thymidine kinase promoter gene linked on the upstream of renilla luciferase gene were introduced simultaneously by using a transfection reagent ("Superfect transfection reagent", product of Promega Corporation) each in an amount of 0.5 µg/well. The culture broth was then replaced with a DMEM (—FCS) medium containing a test substance, followed by incubation for further 24 hours. After washing with PBS, the cells were lysed using dual luciferase assay system (product of Promega Corporation). To the resulting lysate, a substrate solution containing luciferin was added and firefly and renilla luciferase activities were measured by a luminometer. In this test system, a PPAR-dependent gene transcriptional activator was searched for by measuring the transcriptional activity (luciferase activity of PPAR-dependent gene. It is to be noted that the PPAR-dependent gene transcriptional activity (luciferase activity) was defined as described below.

PPAR-dependent gene transcriptional activity (luciferase activity)=(firefly luciferase activity by PPAR-Luc)/(renilla luciferase activity by TK-Luc)

In Table 8, PPAR-dependent gene transcription activating capacity of each test substance in IEC-6 and HepG2 cell lines is shown. In this table, PPAR-dependent transcriptional activity by the control is set at 100 and activity relative to it is indicated. As a positive control, fenofibrate was employed.

TABLE 8

| Test substance | Test concentration | IEC-6 | HepG2 |
|---|---|---|---|
| Control | — | 100 | 100 |
| Epigallocatechin gallate | 10 µM | 184 | 172 |
| Epicatechin gallate | 10 µM | 178 | 166 |
| Green tea extract*[1] | 0.01 wt. % | 166 | 163 |
| Catechin | 10 µM | 152 | 149 |
| Epicatechin | 10 µM | 158 | 150 |

*[1]"Thea-furan 90S" (product of Itoen Co., Ltd.)

As is apparent from Table 8, catechins are effective for PPAR-dependent gene transcription activation.

INDUSTRIAL APPLICABILITY

The packaged beverages of the present invention are excellent in stability of color tone and transparent appearance even after long-term storage, have a smooth feeling in the throat upon drinking, and have good palatability; and in addition, have PPAR-dependent gene transcription activating effects which are safe and effective for prevention and alleviation of obesity.

The invention claimed is:

1. A packaged beverage, which comprises, in the dissolved form, catechins composed of the following non-polymer component (A) and another non-polymer component (B):
    (A) non-epi-catechins,
    (B) epi-catechins, and has, per 500 mL of the packaged beverage, said components in amounts satisfying the following equations:

$(A)+(B)$=460 to 2500 mg     (i)

$(A)$=160 to 2250 mg     (ii)

$(A)/(B)$=0.54 to 9.0.     (iii)

2. A packaged beverage according to claim 1, wherein 30 to 98 wt. % of the catechins contained in the beverage are epigallocatechin gallate, gallocatechin gallate, epigallocatechin and gallocatechin.

3. A packaged beverage according to claim 1 or 2, obtained by adding a tea extract concentrate to a tea liquid extract.

4. A packaged beverage comprising the following non-polymer component (A'), another non-polymer component (B') and a component (C):
    (A') non-epi-catechins,
    (B') epi-catechins,
    (C) cyclodextrins; and having, per 500 mL of the packaged beverage, said components in amounts satisfying the following equation:

$(A')+(B')$=460 to 1300 mg,     (i)

$(A')$=160 to 1040 mg     (ii)

$(A')/(B')$=0.54 to 4.0, and     (iii)

$(C)$=750 to 5000 mg; and having a haze value of 22 or less.     (iv)

5. A packaged beverage according to claim 4, wherein Components (A') and (B') are obtained by adding a tea extract concentrate to water or a tea liquid extract.

6. A packaged beverage according to claim 5, wherein out of the total amount of Components (A') and (B'), at least 20 wt. % is derived from the tea extract concentrate.

7. A packaged beverage according to claim 5, wherein the tea liquid extract is obtained by extraction of unfermented tea or semi-fermented tea.

8. A packaged beverage according to claim 1 having a pH of 3 to 7.

9. The packaged beverage according to claim 1, wherein the ratio of (A)/(B) ranges from 0.8 to 9.0.

10. The packaged beverage according to claim 1, wherein the ratio of (A)/(B) ranges from 0.54 to 5.67.

11. (v) The packaged beverage according to claim 1, wherein the ratio of (A)/(B) ranges from 0.54 to 4.0.

12. The packaged beverage according to claim 1, wherein the ratio of (A)/(B) ranges from 0.54 to 2.58.

13. The packaged beverage according to claim 4, wherein the ratio of (A')/(B') ranges from 0.67 to 4.0.

14. The packaged beverage according to claim 4, wherein the ratio of (A')/(B') ranges from 0.82 to 2.58.

15. The packaged beverage according to claim 4, wherein the ratio of (A')+(B')/(C) ranges from 0.1 to 1.73.

16. The packaged beverage according to claim 4, wherein the ratio of (A')+(B')/(C) ranges from 0.1 to 1.4.

17. The packaged beverage according to claim 4, wherein the ratio of (A')+(B')/(C) ranges from 0.2 to 1.4.

18. A packaged beverage according to claim 4 having a pH of 3 to 7.

19. The packaged beverage according to claim 1, wherein the ratio of (A)/(B) ranges from 0.8 to 2.45.

20. The packaged beverage according to claim 1, wherein the amount of (A)+(B) ranges from 500 to 2500 mg.

21. The packaged beverage according to claim 1, wherein the amount of (A)+(B) ranges from 460 to 1300 mg.

22. The packaged beverage according to claim 1, wherein the amount of (A)+(B) ranges from 460 to 927 mg.

23. The packaged beverage according to claim 4, wherein the amount of (A')+(B') ranges from 460 to 1000 mg.

24. The package beverage according to claim 1, wherein the amount of (A)+(B) ranges from 500 to 1300 mg.

* * * * *

UNITED STATES PATENT AND TRADEMARK OFFICE
CERTIFICATE OF CORRECTION

| | | |
|---|---|---|
| PATENT NO. | : 7,968,139 B2 | Page 1 of 1 |
| APPLICATION NO. | : 10/416924 | |
| DATED | : June 28, 2011 | |
| INVENTOR(S) | : Setsujiro Inaoka et al. | |

It is certified that error appears in the above-identified patent and that said Letters Patent is hereby corrected as shown below:

Column 16, line 34, "11. (v) The packaged beverage" should read -- 11. The packaged beverage --.

Signed and Sealed this
Sixth Day of December, 2011

David J. Kappos
*Director of the United States Patent and Trademark Office*